(12) United States Patent
Borras et al.

(10) Patent No.: US 8,761,361 B2
(45) Date of Patent: Jun. 24, 2014

(54) MANAGEMENT UNIT WITH MICROPHONE

(75) Inventors: Jaime Andres Borras, Miramar, FL (US); Betsy Owens, Winnetka, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 271 days.

(21) Appl. No.: 13/351,918

(22) Filed: Jan. 17, 2012

(65) Prior Publication Data

US 2012/0321093 A1    Dec. 20, 2012

Related U.S. Application Data

(60) Provisional application No. 61/433,728, filed on Jan. 18, 2011.

(51) Int. Cl.
*H04M 11/00* (2006.01)

(52) U.S. Cl.
USPC .................. 379/106.01; 379/102.03

(58) Field of Classification Search
USPC ........................ 379/102.03, 106.01
See application file for complete search history.

(56) References Cited

U.S. PATENT DOCUMENTS

| | | | |
|---|---|---|---|
| 6,934,862 B2 * | 8/2005 | Sharood et al. | 713/300 |
| 2010/0023938 A1 * | 1/2010 | Lee et al. | 717/171 |

* cited by examiner

*Primary Examiner* — Alexander Jamal
(74) *Attorney, Agent, or Firm* — McAndrews, Held & Malloy, Ltd.

(57) ABSTRACT

An example energy management unit (EMU) with diagnostic capabilities is provided. The EMU with can receive and identify the operational status of a device by receiving an audio signal from the device generated by the device's self diagnostic system. The EMU can decode the diagnostic information and retransmit the decoded information as necessary for further processing.

11 Claims, 3 Drawing Sheets

MANAGEMENT UNIT WITH MICROPHONE

CROSS REFERENCE TO RELATED APPLICATION

This application is a non-provisional application claiming priority from U.S. Provisional Application Ser. No. 61/433,728, filed Jan. 18, 2011, entitled "Wall Outlet with Microphone," and incorporated herein by reference in its entirety.

FIELD OF THE DISCLOSURE

The present disclosure generally relates to identifying a potential malfunction, end-of-life warning, or diagnostic information and correcting failure modes for appliances and equipments, and more particularly to an Energy Management Unit (EMU) with a microphone.

BACKGROUND

The current "smart grid" initiative using "smart meters" is driving appliance and equipment manufacturers to provide connectivity that can respond to and control the peak energy loads in residential and business settings. Smart meters raise consumer awareness of the cost and impact of electric devices. Such devices typically utilize ZigBee® communication protocol for wireless home area networks relying upon different energy profiles to deliver both energy and other information. As ZigBee® is a relatively low data rate wireless protocol that does not support streaming of content or downloads for remote software updates and applications, WiFi is used complementarily.

For instance, ZigBee is a wireless language connecting different devices to work together. Available ZigBee networks provide a suggested standard for deploying switches, sensors, and controllers using harvested energy in residential, commercial, and industrial environments. The ZigBee networks include a physical radio using IEEE 802.15.4 standard radios operating in a 2.4 GHz band. The proposed ZigBee standard seeks to provide interference avoidance, mesh networking, security, certification, and an open standard.

While smart meters oftentimes assist in the easing of data collection regarding overall dwelling power usage, and may provide empirical data regarding the overall usage of power by a metered building, the smart meter fails to provide any services to monitor and or predict power consumption, potential malfunction, and/or end-of life of an individual power consumer within the dwelling itself.

Still further, appliances capable of producing diagnostic audible tones already exist, such as for example, as described in US Publication Number 2010/0023938, hereby incorporated by reference in its entirety. The diagnostic tones are transmitted to a central service center, wherein they are interpreted and/or diagnosed through audible tone detection. The present disclosure, however, provides an alternative detection scheme for use in detecting audible communications.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure described herein addresses the problem of identifying a potential malfunction or end-of-life for an appliance or equipment when it is connected to an electrical outlet provided on an energy management unit (EMU). The disclosed is further able to combine the diagnostic capabilities of the appliance or equipment with the EMU toward informing the consumer when an appliance or piece of equipment is reaching the end of its life.

In operation, the EMU can notify a service department of a potential appliance or equipment failure before a failure actually occurs. Moreover, the EMU can inform the user when an associated appliance or piece of equipment is reaching the end of its useful life and permit the consumer to avoid the additional inefficiencies associated with appliance or equipment break-downs while also suggesting a replacement appliance or equipment. The EMU disclosed herein can be offered by a service contractor to consumers on a contract or subscription basis, wherein the service contractors may provide ongoing service to monitor, collect, host and analyze appliance or equipment performance, warning signs and energy consumption data. The EMU further facilitates the ability to offer consumers cost saving recommendations and usage optimization.

In addition to monitoring and reporting the energy usage, the EMU may function to identify a potential failure or end-of-life condition by detecting a higher power consumption, an abnormal power waveform or by receiving a signal from the appliance or equipment itself generated by the appliance's or piece of equipment's self diagnostic system.

The following relates to incorporating a microphone with demodulation and remodulation circuitry into a wall plug Energy Management Unit (EMU). Incorporating a microphone into a wall plug in this manner solves the problem of not being able to detect the diagnostic audible tones ripple from the appliance supply line connected to the EMU. It also frees the consumer from having to call a service center and to then place and hold the phone next to the appliance to thereby capture diagnostic tones information as described in USPTO Publication Number 2010/0023938 assigned to LG, i.e., the LG washer and refrigeration products or appliances.

The system leverages the already available diagnostic audible tones from the LG washer and refrigeration products which send failure mode information to the service department via audio coupling through a cell phone. The audible tones transfer data about the appliance failure modes and hence improves problem definition, reduce miss-repairs and additional technician visits at the consumer homes; saving money and time.

DETAILED DESCRIPTION

The following description of example methods and apparatus is not intended to limit the scope of the description to the precise form or forms detailed herein. Instead, the following description is intended to be illustrative so that others may follow its teachings.

Figure 1:
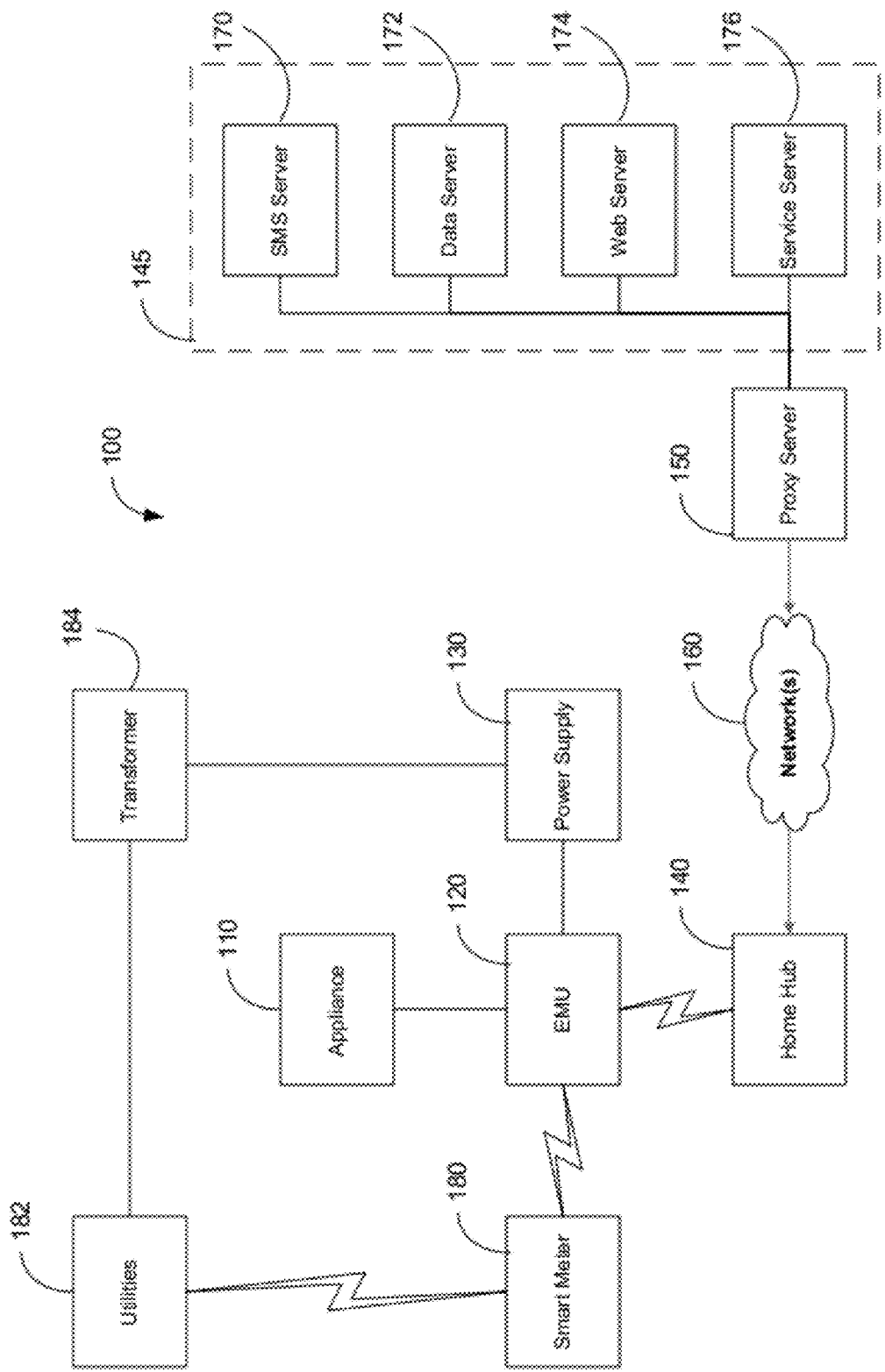
FIG. 1 is a system diagram of an example EMU with diagnostic capabilities connected to an appliance and the communication of data therefrom.

FIG. 1 illustrates an example Energy Management Unit (EMU) system 100 comprising an EMU 120 connected device such as an appliance 110 and the communication of data therefrom. The present disclosure takes advantage of a smart grid energy monitoring device or EMU 120, including, for example, one with a wall-plug form factor or any other suitable device. The example EMU 120 plugs directly into an ordinary 120 volt, 60 Hz electrical socket 130. It is further contemplated that the EMU 120 may be adapted to plug and/or electrically couple into any suitable power supply including for instance an electrical socket of any suitable voltage and/or prong geometry. It will also be appreciated that the EMU 120 may be power via any suitable electrical supply including, for example, direct AC and/or DC supplies. In other examples, the appliance 110 may be any piece of equipment suitably coupled to the EMU 120, such as, for example, a washing machine, a dryer, a refrigerator, a television, a coffee maker, etc. It will be understood that there are many other appliances and/or pieces of equipment that may be used with the EMU 120 without departing from the spirit of the present disclosure.

Figure 2:
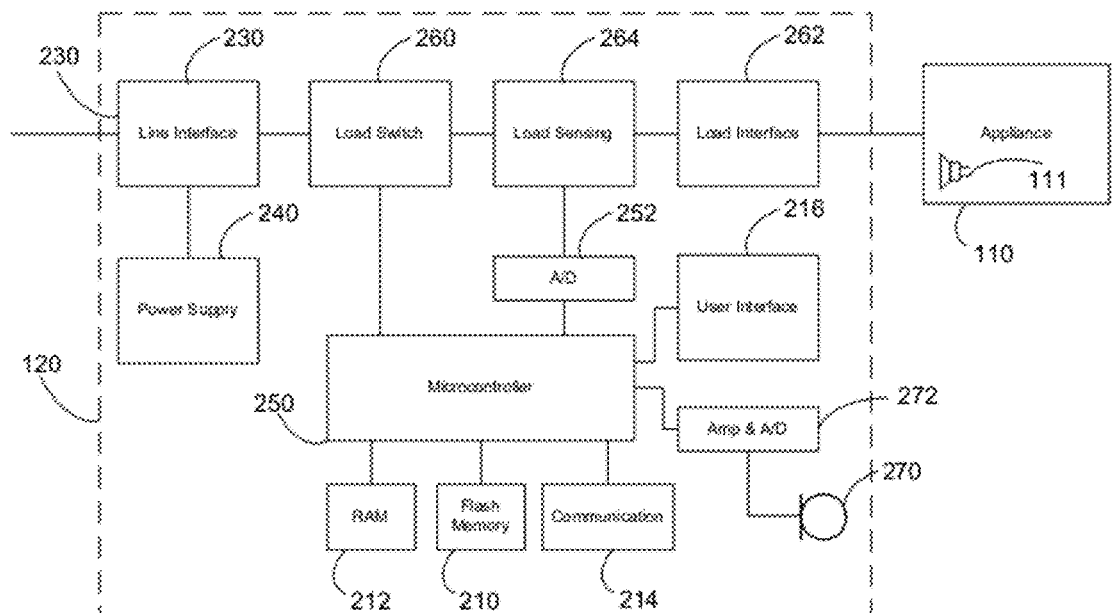
FIG. 2 is a component diagram of the example EMU of FIG. 1.

The example EMU 120 is configured to measure the energy usage of the connected appliance 110 or other piece of equipment. The EMU 120 is further configured to store the energy usage data in its own memory. For example, as illustrated in FIG. 2, the EMU 120 includes a flash memory 210 and/or a random access memory (RAM) 212 to store the collected energy use data. The EMU 120 may use other types of memory in addition to, or in lieu of, flash memory 210 and RAM 212 to store the energy use data. The energy use data is, in turn, transmitted to a "home hub" 140 (see FIG. 1) such as, for example, a personal computer (PC), terminal, router, smartphone, tablet, or other suitable device) via a communicator 214 such as a wireless connection using the local area network with WiFi, ZigBee®, Bluetooth, infrared, or the like. While the connection between the EMU 120 and the home hub 140 is illustrated as being a communicator 214, a person of ordinary skill in the art will recognize that the data connection may be any suitable connection including a wired connection as desired. Software, firmware, and/or hardware executing and/or contained within the home hub 140 processes the transmitted energy use data generated by the connected appliance 110 and EMU 120 and is adapted to at least one of displays the data on an integrated and/or external display having a user interface 216, and/or transmit the data to a remote computer center 145, such as a company-operated proxy server 150 or cloud service 160 through an Internet, cellular, wireless, wired, LAN, tethered, and/or any other suitable connection.

In this example, the transmitted energy use data is segregated into different services and/or servers as shown in FIG. 1, including an SMS server 170, a data server 172, a web server 174, or a service server 176. While the energy use data is segregated in the illustrated example, the data need not be divided or alternatively may be divided even further as desired. In at least one example, the operator of the remote computer center 145 may offer to a consumer on a contract and/or subscription basis, services to monitor, collect, host, and/or otherwise analyze appliance performance, warning signs, and/or energy use data. Thus, the example EMU 120 facilitates the ability for an operator to offer consumers cost saving recommendations and usage optimization.

Referring again to FIG. 1, the home hub 140 may also transmit energy use data to a smart meter 180, via a wireless connection using ZigBee® or the like. In this example, the smart meter 180 is a typical electrical meter that records consumption of electric energy in predefined intervals, such as intervals of an hour or less and communicates consumption information back to a utility company 182 for monitoring and/or billing purposes. Typically, the smart meter 180 enables two-way communication between the meter and a central system. Accordingly, the utility company 182 providing the power to the appliance 110 and/or other equipment via a power line including, for example, a transformer 184, can access the energy use data stored on the smart meter 180 for further review.

As noted above, an example EMU 120 is shown in FIG. 2. The example EMU 120 comprises a line interface 230 which is inductively coupled to the power line to rectify and provide line powered DC voltage 240 to a microcontroller 250, the memories 212, 210, an analog-to-digital (A/D) converter 252, the communicator 214, and the user interface 216. A load switch 260, such as for example, a solid state relay removes or applies power to the coupled appliance 110 through a load interface circuit 262. The example load switch 260 and the example load interface 262 are in series with a load monitoring/sensing circuit 264. The example load monitoring/sensing circuit 264 provides a stepped-down current signal which is within the operating range of the A/D converter 252 for subsequent sampling by the microcontroller 250. As previously described, the communicator 214 periodically transmits energy use data to the home hub 140 via a wireless and/or wired connection using the local area network with WiFi, ZigBee®, or the like. The user interface 216 communicates the status of the EMU 120 and provide at least one user interface element which allows the user to interact with the EMU 120. For instance, the user interface 216 may provide a display on which energy use data and the like are shown to the user. Additionally, the user interface 216 may also provide one or more input user interface elements through which the user can toggle interact with the EMU 120 to retrieve further information regarding energy use, to on and/or off various appliances including the appliance 110, to customize various features and/or settings of the EMU 120 depending on the particular appliance or piece of equipment connected to the EMU 120, to customize various user preferences, etc.

In this example, the EMU 120 also includes a microphone 270, and/or any other suitable audio detection device. The microphone 270 may be electronically coupled to the microcontroller 250 through an amplifier/analog to digital converter 272. Meanwhile, the appliance 110 (as described in detail in US Patent Publication 2010/0023938, incorporated by reference in its entirety) includes a sound output device 111 that outputs a sound corresponding to a control signal, e.g., generate an acoustic signal according to the control signal. The control signal, as will be appreciated, may include information gleamed from a sensing device that senses the operating state of the appliance 110. For example, when a problem occurs in an operation of an appliance drainage pump (not shown) during a drainage process of the appliance 110 such that the drainage is not ended within a preset drainage setting time, the appliance 110 may compare a drainage time sensed by the sensing device with the drainage setting time, and judge whether the appliance is out of order. The appliance 110 may then output the control signal including product information into an acoustic signal which is the electrical signal with the frequency characteristic. The appliance 110 may include a DA converter to convert the digital control signal into the acoustic signal which is the electrical signal with the frequency characteristic according to the control signal. Here, the acoustic signal is a combination of unit frequency signals continuing for a predetermined time, and each unit frequency signal is any one of two different frequency signals.

The microphone 270 will pick up the diagnostic audible signals from the appliance 110, will apply a detection algorithm, and will forward the signals to a service center via the connectivity technology in the EMU 120.

More particularly, appliance 110 provides remote diagnostics data via audible tones that require the consumer to place a cell phone, or other communication device in near proximity of the audible transducer for the transfer of information to the remote service center. At the service center the data is demodulated, recorded and analyze to extract the diagnostics information. The present EMU 120, however, provides the convenient microphone 270 and includes an algorithm to detect the tones and thus the diagnostic information for retransmission to a service center (e.g., the proxy server 150) via the communicator 214, thus making a telephonic connection with the service center obsolete.

Figure 3:
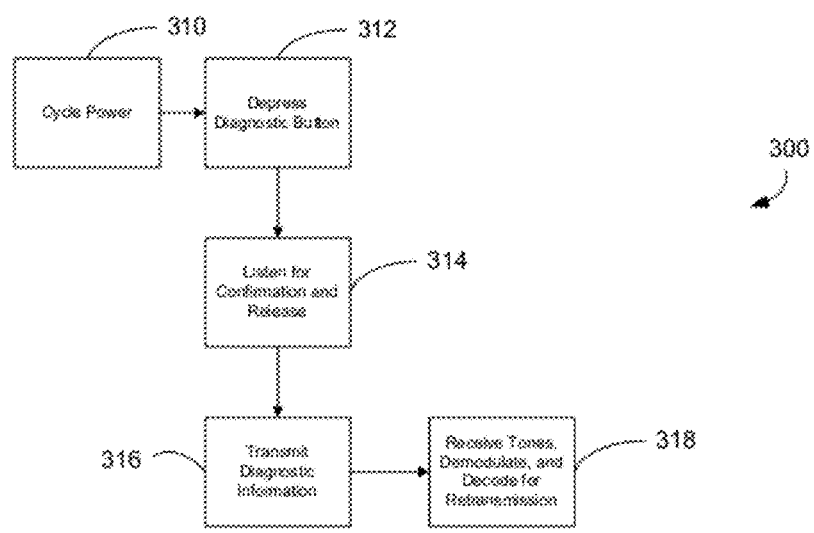
FIG. 3 is a flow chart illustrating one example diagnostic tone detection sequence.

As illustrated in FIG. 3, the appliance 110 diagnostic tones are part of a system 300 which provides the ability for the appliance 110 to communicate directly to the remote proxy server 150, and/or remotely located specially trained technicians following the press of a button. In one example, a three beeps sequence starts at block 314 following the appliance 110 power cycle (off and then back on) (block 310), and pressing of a diagnostic appropriate button (washer/rinse button for washers, temp button for dryers, and/or any other suitable initiation button) at block 312. The diagnostic tone sequence commences at block 316.

The microphone 270 receives the transmitted diagnostic tones at block 320, avoiding the use of the phone connection and provides for the analysis of the tone sequence. In one example, the transmission consists of four short bursts or frames of 15 bytes (120 bits) each at an approximate rate of 125 bits/sec using Binary Frequency Shift Keying (BFSK) modulation around 2.6KHz and 2.8 KHz tones for 100 ms. The lower frequency signal corresponding to a digital logical value of "zero" and the higher frequency corresponds to a digital logical value of "one".

The loudness of the speaker 111 embedded in the appliance 110 is typically 90 dB SPL (Sound Pressure Level) and the EMU 120 with the microphone 270 is preferably located within a distance from the appliance 110 to detect and process the generated audibly sounds. For example, the EMU 120 may be placed no more than a cord away (two to three feet). To estimate the SPL at the microphone one example formula (Eq. 1) may used, which considers that the reverberation of sound and the room variables:

$$Lp = Lw + 10 \log(D/(4\pi r^2) + 4/R) \quad \text{(Eq. 1)}$$

where: Lp=received sound pressure level (dB); Lw=sound pressure level from the source; D=directivity coefficient; R=room constant (m^2 Sabine); $\pi$=3.14; and r=distance from source (m).

Equation 1 can be transform to express the difference between the received sound pressure level and emitted sound power, i.e. the attenuation, as shown in Eq. 2:

$$Lp - Lw = 10 \log(D/(4\pi r^2) + 4/R) \quad \text{(Eq. 2)}$$

Figure 4:
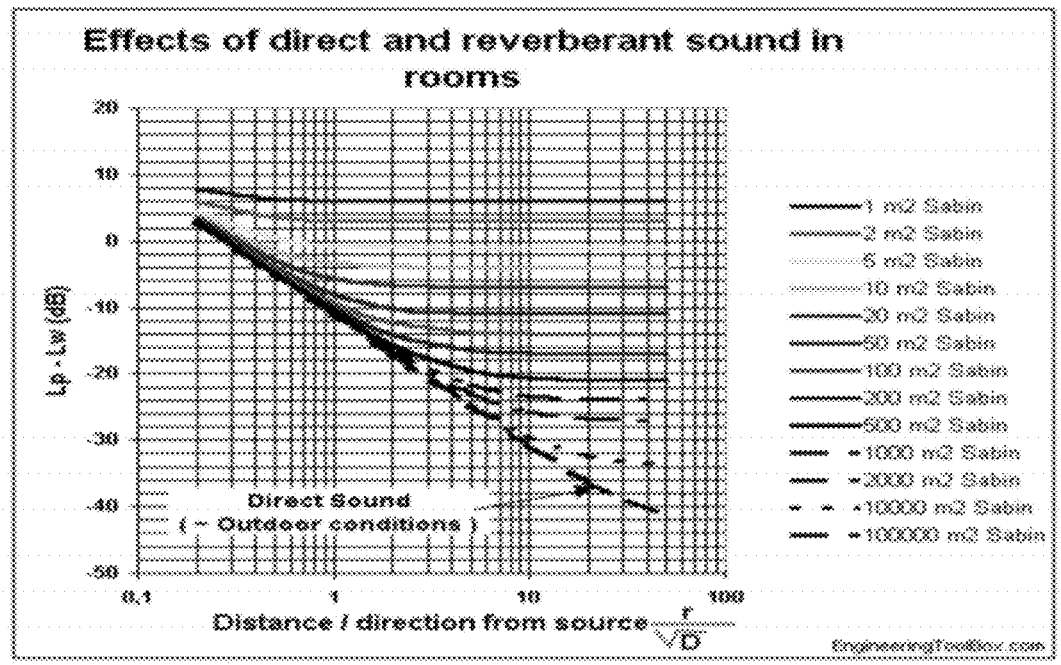
FIG. 4 is a graphical representation of the effects of direct and reverberant sound in an example room.

The sound attenuation can also be estimated from any suitable attenuation estimation, including, for example, the diagram shown in FIG. 4, showing a typical attenuation of 8 to 10 dB for a 3 feet or 1 meter distance in a rooms above 10 m^2 Sabin, where Sabin is the unit of acoustical absorption.

Figure 5:
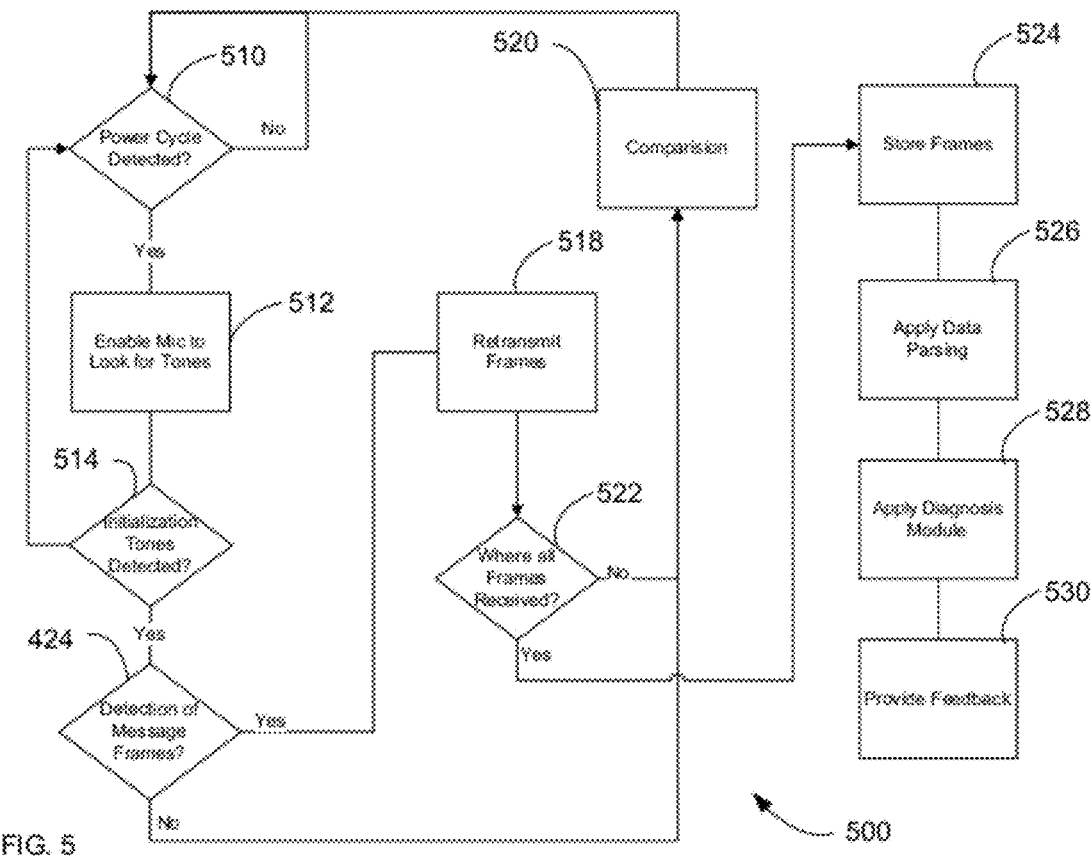
FIG. 5 is a flow chart illustrating a process to detect and transmit diagnostic tones representative of the operation of a device.

Referring to FIG. 5, an example detection process 500 is shown. In the example process 500, once the EMU 120, has detected the appliance power cycle at block 510, the microphone 270 is enabled at block 512 to start looking for the three consecutive beeps, at block 514 and to prepare for the reception of the four diagnostic frames at block 516. In case that the three consecutive beeps are not detected (block 514), the algorithm returns to look for the power cycling condition (block 510). In an appliance 110 where the power is not cycled to start the diagnostic sequence, the EMU 120 may be configured to look for the three consecutive tones and the power drain signature for this condition through the EMU 120. Once the three consecutive tones are detected (block 514), the EMU 120 starts looking for the acoustical four frames sequence that contains the detail diagnostic information at block 516.

If the diagnostic information is received at block 516, then it is retransmitted via the connectivity medium of the EMU 120 at block 518 (e.g., WiFi, ZigBee, PLC, or other suitable communication). If the diagnostic information is not received, or is received without clarity, a retry message may be provided to the appliance 110 at block 520. Once the frames are retransmitted, a similar validation sequence is conducted by the receiver (e.g., the home hub 140, or other receiver) at block 522. If properly received, the diagnostic information may be, for example, stored at block 524 for subsequence analysis. In this instance, the stored data is processed such that in each frame, the data is de-interleaved, and corrected from any transmission errors at block 526, before being passed through the diagnosis module to decode the failure mode status at block 528. The failure mode status may then be transmitted to the Home Hub 140 (or directly to the proxy server 150) as desired to provide next steps feedback for the consumer at block 530.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. An energy management unit operable to couple a power supply to a device, the energy management unit comprising:
   a power source to provide power to a microcontroller, a memory, a microphone, and a communicator;
   the microphone electrically coupled to the microcontroller and configured to receive audio control signals generated by a self diagnostic system of the device, the audio control signals representative of an operation of the device; and
   the microcontroller comprising instructions that when executed cause the microcontroller to demodulate and decode the received audio control signals, and
   wherein the communicator transmits the decoded audio control signals.

2. The energy management unit according to claim 1, wherein the microcontroller comprises instructions that when executed cause the microcontroller to determine if there is an error in the received audio signal.

3. The energy management unit according to claim 1, comprising a user interface having a screen on which data is displayed and one or more controls through which various features of the device may be toggled on or off, or customized.

4. The energy management unit according to claim 1, wherein the communicator transmits the decoded audio signal to a central server.

5. The energy management unit according to claim 4, wherein the communicator receives information from the central server regarding the transmitted audio code.

6. The energy management unit according to claim 5, comprising a user interface coupled to the microcontroller, wherein the received information is displayed on the user interface.

7. A diagnostic detection system, the system comprising:
a device comprising:
   a self diagnostic system configured to generate an audio control signal representative of an operational status of the device, and
   an audio transmitter configured to broadcast the audio control signal;
a receiving device operable to couple a power supply to the device, the receiving device comprising a power source, a microcontroller, a memory, a microphone, and a communicator;
the microphone electrically coupled to the microcontroller and configured to receive the audio control signals broadcast by the audio transmitter of the device;
the microcontroller comprising instructions that when executed cause the microcontroller to demodulate and decode the received audio control signals, and
wherein the communicator transmits the decoded audio control signals; and
a central server configured to receive the transmitted decoded audio control signals.

8. The system according to claim 7, wherein the device is an appliance.

9. The system according to claim 8, wherein the receiving device is an energy management unit.

10. The system according to claim 7, wherein the central server is a remote computer center connected to a hub through a network connection, and wherein the hub first receives the decoded audio control signals from the receiving device and provides the central server the decoded audio control signals through the network.

11. The system according to claim 10, wherein the hub is personal computer or tablet device.

* * * * *